US011100721B1

(12) United States Patent
Bois et al.

(10) Patent No.: US 11,100,721 B1
(45) Date of Patent: Aug. 24, 2021

(54) INTEGRATING 2D IMAGES INTO A DISPLAY OF A 3D REALITY MESH TO RECOVER LOST CONTEXT

(71) Applicant: Bentley Systems, Incorporated, Exton, PA (US)

(72) Inventors: Richard Bois, Quebec (CA); Mathieu St-Pierre, Ste-Brigitte de Laval (CA)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 17/087,299

(22) Filed: Nov. 2, 2020

(51) Int. Cl.
*G06T 19/00* (2011.01)
*G06T 17/20* (2006.01)
*G06T 19/20* (2011.01)
*G06T 11/00* (2006.01)
*G06F 3/0484* (2013.01)
*G06T 7/73* (2017.01)
*G06F 3/0481* (2013.01)
*G06T 7/00* (2017.01)

(52) U.S. Cl.
CPC ........ *G06T 19/006* (2013.01); *G06F 3/04815* (2013.01); *G06F 3/04842* (2013.01); *G06F 3/04845* (2013.01); *G06T 7/0002* (2013.01); *G06T 7/75* (2017.01); *G06T 11/00* (2013.01); *G06T 17/20* (2013.01); *G06T 19/20* (2013.01)

(58) Field of Classification Search
CPC .. G06F 3/011; G06F 3/04815; G06F 3/04842; G06F 3/04845; G06T 7/0002; G06T 7/75; G06T 11/00; G06T 15/00; G06T 17/00; G06T 17/20; G06T 19/00; G06T 19/006; G06T 19/20

USPC ........................................................ 345/633
See application file for complete search history.

(56) References Cited

U.S. PATENT DOCUMENTS

| | | | |
|---|---|---|---|
| 8,026,929 | B2 | 9/2011 | Naimark |
| 8,160,400 | B2 | 4/2012 | Snavely et al. |
| 8,264,504 | B2 | 9/2012 | Naimark |
| 8,295,589 | B2 | 10/2012 | Ofek et al. |
| 8,487,957 | B1 | 7/2013 | Bailly et al. |
| 8,659,595 | B2 | 2/2014 | Chin et al. |
| 8,928,666 | B2 | 1/2015 | Ofstad et al. |

(Continued)

OTHER PUBLICATIONS

Anguelov, Dragomir, et al., "Google Street View: Capturing the World at Street Level," Cover Feature, IEEE Computer Society, Computer, vol. 43, Issue 6, Jun. 7, 2010, pp. 32-38.

(Continued)

*Primary Examiner* — Sae Won Yoon
(74) *Attorney, Agent, or Firm* — Cesari and McKenna, LLP; James A. Blanchette

(57) ABSTRACT

In example embodiments, techniques are provided integrating 2D images into the display of a 3D reality mesh to recover lost context. A determinization is made whether there is level of detail (LOD) in the 3D reality mesh sufficient to provide full context for a desired view of the 3D reality mesh. When such a LOD does not exist, a subset of the source 2D images that intersect a view frustrum for the desired view is selected from the set of 2D images used to reconstruct the 3D reality mesh. The selected source 2D image is evaluated to determine if it would be visually appropriate for the desired view. If the selected source 2D image is determined to be visually appropriate, the 3D reality mesh is replaced with the selected source 2D image or a portion thereof.

18 Claims, 8 Drawing Sheets

(56) References Cited

U.S. PATENT DOCUMENTS

| | | |
|---|---|---|
| 9,129,438 B2 | 9/2015 | Aarts et al. |
| 9,460,561 B1 | 10/2016 | Côté et al. |
| 9,582,936 B2 | 2/2017 | Lee et al. |
| 9,691,175 B2 | 6/2017 | Rane |
| 2007/0110338 A1 | 5/2007 | Snavely et al. |
| 2007/0146360 A1 | 6/2007 | Clatworthy et al. |
| 2008/0024484 A1 | 1/2008 | Naimark |
| 2009/0179895 A1 | 7/2009 | Zhu et al. |
| 2009/0245691 A1 | 10/2009 | Naimark et al. |
| 2011/0166831 A1 | 7/2011 | Snyder et al. |
| 2011/0234581 A1 | 9/2011 | Eikelis et al. |
| 2011/0310088 A1 | 12/2011 | Adabala et al. |
| 2013/0135446 A1 | 5/2013 | Lee et al. |
| 2014/0125671 A1* | 5/2014 | Vorobyov .......... G06K 9/00637 345/427 |
| 2015/0243069 A1* | 8/2015 | Knoblauch .......... G06T 11/001 345/420 |
| 2017/0245815 A1* | 8/2017 | Allaire ................ A61B 8/0883 |

OTHER PUBLICATIONS

"ContextCapture®: Software to Automatically Generate Detailed 3D Models from Photographs," Quick Start Guide, CONNECT Edition, Bentley, Mar. 17, 2017, pp. 1-34.

Dowling, T. I., et al., "Very High Resolution DEM Acquisition at Low Cost Using a Digital Camera and Fee Software," 18$^{th}$ World IMACS/MODSIM Congress, Cairns, Australia, Jul. 13-17, 2009, pp. 2479-2485.

Pomaska, Guenter, "Utilization of Photosynth Point Clouds for 3D Object Reconstruction," 22$^{nd}$ CIPA Symposium, Kyoto, Japan, Oct. 11-15, 2009, pp. 1-5.

Snavely, Noah, et al., "Scene Reconstruction and Visualization From Community Photo Collections," IEEE, Proceedings of the IEEE, vol. 98, No. 8, Aug. 2010, pp. 1370-1390.

\* cited by examiner

INTEGRATING 2D IMAGES INTO A DISPLAY OF A 3D REALITY MESH TO RECOVER LOST CONTEXT

BACKGROUND

Technical Field

The present disclosure relates generally to techniques for displaying a three-dimensional (3D) mesh, and more specifically to techniques for recovering lost context when displaying a 3D reality mesh.

Background Information

It is often desirable to create a 3D model of existing infrastructure (e.g., buildings, roads, bridges, dams, railways, telecommunications towers, electrical power networks, etc.). While 3D models may be created manually utilizing computer aided design (CAD) software, such process can be quite time consuming. Accordingly, there is increasing interest in automatic model generation software, including 3D reconstruction software, that can automatically reconstruct a 3D model from source 2D images (e.g., 2D photographs captured by a handheld camera or a camera of an unmanned aerial vehicle (UAV)).

3D reconstruction software may receive a set of source 2D images from different viewpoints, analyze those images, automatically compute camera parameters and 3D geometry, and generate therefrom a 3D model referred to as a 3D reality mesh. The overall operation is often divided into two distinct stages: an automatic structure-from-motion (SfM) stage and a dense 3D reconstruction stage. The automatic SfM stage typically involves SfM techniques that compute camera parameters of each of the images and generate a low-density (i.e. sparse) 3D point cloud. The 3D reconstruction stage typically involves a dense 3D reconstruction that produces a polygon mesh from the sparse 3D point cloud and camera parameters and applies textures to the polygon mesh. The stage may apply multi-view stereo (MVS) reconstruction techniques to produce a high resolution dataset and utilize photogrammetry algorithms and texturing techniques. In some cases, the set of source 2D images may be supplemented with point cloud data (e.g., captured by a laser scanner or other device) to improve results.

FIG. 1 is a view 100 of an example 3D reality mesh that may be produced by 3D reconstruction software. Here, the 3D reality mesh shows a mixed-use building with stores on the first floor and apartments above. The example 3D reality mesh was generated from a set of source 2D images of the mixed-use building captured from different viewpoints.

While 3D reality meshes are quite useful for many applications, they have a number of issues. One common issue is that 3D reconstruction may destroy certain context, so that a resulting 3D reality mesh may be missing shape or surface texture information that was visible in one or more of the source 2D images it was produced from. An object may be modeled using too few polygons to represent its shape adequately. Likewise, textures may be blurred or distorted. As a result, the shape or surface texture in the 3D reality mesh may not adequately reflect the real-world. A user may attempt to "zoom in" on the object to discern its shape or surface texture. However, since the shape or surface texture information is lost and not simply too small to see, they will simply see a larger version of the insufficiently modeled, blurred or distorted information.

FIG. 2 is a zoomed-in view 200 of a first portion of the example 3D reality mesh of FIG. 1 depicting lost context for a sign. Context is lost such that the text under "rbk" is blurred and unreadable in the texture. The real-world sign includes the text "american grill" under "rbk".

FIG. 3 is a zoomed-in view 300 of a second portion of the example 3D reality mesh of FIG. 1 depicting lost context for a balcony of an apartment. Context is lost such that the texture on the railing is distorted. The distorted texture may be the result of an occluding object in some of the source 2D images (in this example, a tree), which may confuse the 3D reconstruction software.

Lost context decreases the usability of 3D reality meshes when they are displayed to a user. A user may need to see the missing shape or surface texture information to perform a task. Even if the exact information is not required for the task the user is performing, the lost context may decrease the user's confidence in other information being conveyed. When some objects appear blurred or distorted, the user may not trust the rest of the 3D reality mesh.

Accordingly, there is a need for techniques for recovering lost context when 3D reality meshes are displayed.

SUMMARY

In various embodiments, techniques are provided for integrating 2D images into the display of a 3D reality mesh to recover lost context. The 2D images are strategically selected from the set of source 2D images used to reconstruct the 3D reality mesh. A determinization is made whether there is level of detail (LOD) in the 3D reality mesh sufficient to provide full context for a desired view of the 3D reality mesh. When such a LOD does not exist, a subset of the source 2D images that intersect a view frustrum for the desired view is selected from the set of 2D images used to reconstruct the 3D reality mesh. A distance and angle for each source 2D image in the subset is calculated for the desired view. A source 2D image is chosen based on its closeness to a position associated with the desired view and nearness to perpendicular to a view direction vector of the desired view. The selected source 2D image is evaluated to determine if it would be visually appropriate for the desired view. If the selected source 2D image is determined to be visually appropriate, the 3D reality mesh is replaced with the selected source 2D image or a portion thereof. Thereby, context that may be visible in the selected source 2D image but absent from the 3D reality mesh is conveyed to a user.

In one example embodiment, model visualization software executing on one or more computing devices determines a desired view of a 3D reality mesh to be shown in a user interface. The model visualization software selects a source 2D image from a set of source 2D images used to reconstruct the 3D reality mesh, and determines whether the selected source 2D image is visually appropriate for the desired view. The 2D image is considered to be visually appropriate when a distance from the 2D image to a position associated with the desired view satisfies a distance threshold, and an angle from a normal vector of the 2D image to a view direction vector of the desired view satisfy an angle threshold. When the 2D image is determined to be visually appropriate, the model visualization software replaces the 3D reality mesh with the selected source 2D image or a portion thereof in the user interface.

In another example embodiment, a computing device determines a view frustrum based on a desired view of a 3D reality mesh to be shown in a user interface on a display screen. The computing device selects a subset of source 2D images that intersect the view frustrum from a set of source 2D images used to reconstruct the 3D reality mesh and calculates a distance and angle for each source 2D image in the subset. The distance is between a point associated with the source 2D image and a position associated with the desired view, and the angle is an angle between a normal vector of the source 2D image and a view direction vector of the desired view. The computing device selects a source 2D image based on the distance and angle, and replaces the 3D reality mesh with the selected source 2D image or a portion thereof in the user interface.

In still another example embodiment, instructions stored on a non-transitory electronic-device readable medium operate to determine a desired view of a 3D reality mesh to be shown in a user interface. The instructions calculate a distance and angle of source 2D images used to reconstruct the 3D reality mesh for the desired view. The distance is between a point associated with the source 2D image and a position associated with the desired view, and the angle is an angle between a normal vector of the source 2D image and a view direction vector of the desired view. The instructions select a source 2D image based on the distance and angle. The instructions then determine whether the selected source 2D image is visually appropriate for the desired view. A selected source 2D image is considered to be visually appropriate when comparisons to one more thresholds are satisfied. When the selected source 2D image is determined to be visually appropriate, the instructions replace the 3D reality mesh in the user interface with the selected source 2D image or a portion thereof, and, when the selected 2D image is determined to not be visually appropriate, the instructions show the 3D reality mesh in the user interface.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Definitions

As used herein the term "infrastructure" refers to a physical structure that has been built in the real world. Examples of infrastructure include buildings, roads, bridges, dams, railways, telecommunications towers, electrical power networks, and the like.

As used herein the term "3D reality mesh model" or simply a "3D reality mesh" refers to a 3D model that includes a textured polygon mesh that has been automatically generated from a set of 2D images and/or point clouds of the real-world (i.e. from reality).

As used herein the term "context" refers to shape or surface texture of an object represented in a 3D reality mesh. An object represented in a 3D reality mesh may be said to have "full context" when its shape and surface texture adequately reflects aspects of the object in the real-world. An object represented in a 3D reality mesh may be said to have "lost context" when its shape or surface texture does not adequately reflect aspects of the object in the real-world. "Lost context" may be said to be "restored" when a user is provided a view that permits them to observe the aspects of the object that were not adequately reflected.

As used herein the term "view frustrum" refers to a region of space in a 3D model between a view near plane and a view far plane that should appear in a display. A view frustrum may coincide with a frustrum-shaped portion of the field of view of a virtual camera disposed in the 3D space of the 3D model.

As used herein the term "view near plane" refers to a plane defined by parameters of a virtual camera which indicates objects that are too close to a virtual camera in 3D space of a 3D model be displayed. Objects between the virtual camera's position and the view near plane in 3D space of the 3D model are clipped out (i.e. not displayed). Objects beyond the view near plane (e.g., but closer than a view far plane) in 3D space of 3D model are potentially displayed (e.g., provided that they are in the view frustrum.)

As used herein the term "view far plane" refers to a plane defined by parameters of a virtual camera which indicates where objects are too far from the virtual camera in 3D space of a 3D model to be displayed. Objects beyond view far plane are clipped out (i.e. not displayed). Objects closer than the view far plane (e.g., but closer than a view near plane) are potentially displayed (e.g., provided that they are in the view frustrum).

Example Embodiments

Figure 4:
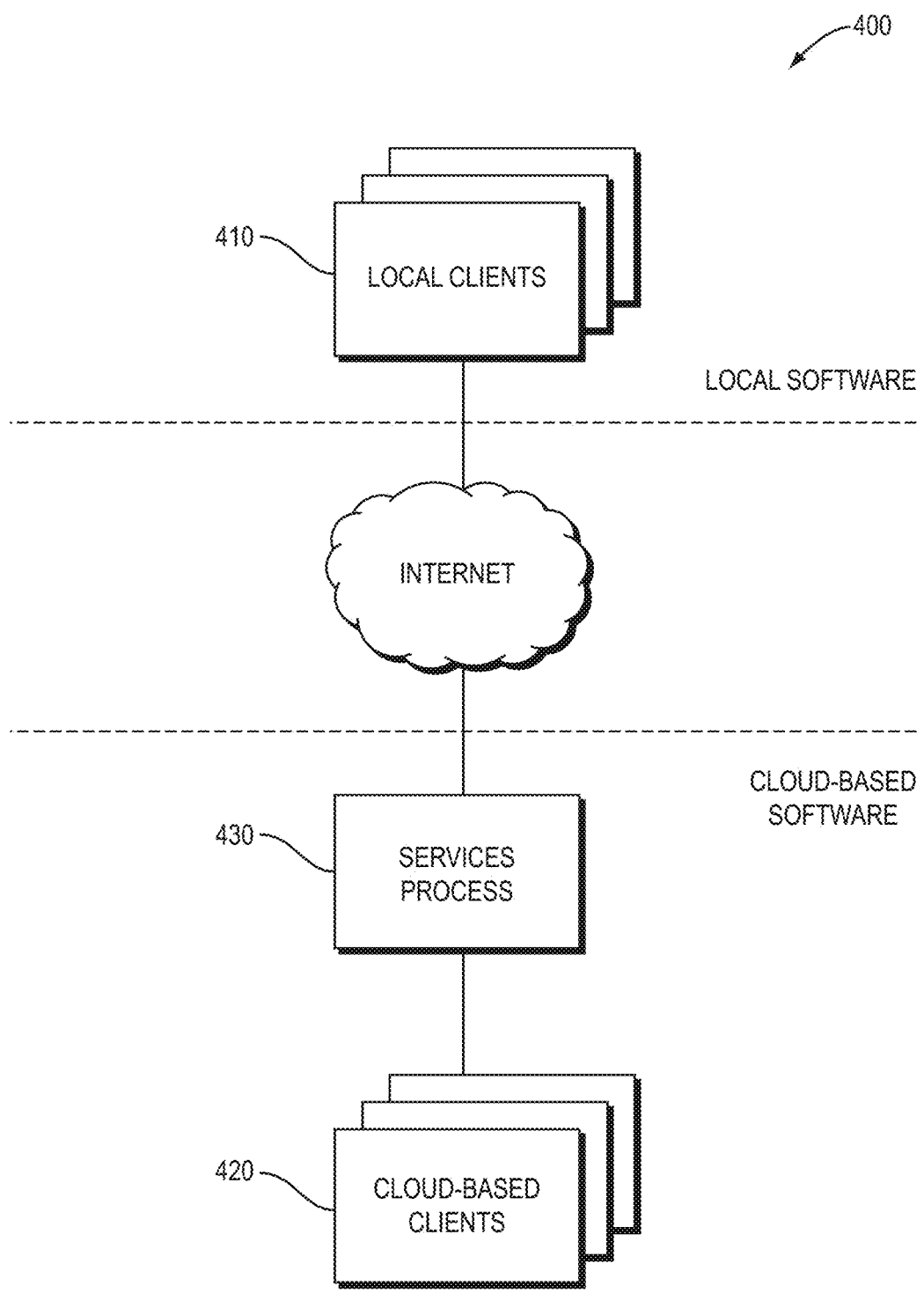
FIG. 4 is a high-level block diagram of an example architecture for 3D reconstruction software and model visualization software that, respectively, produce a 3D reality mesh and integrate 2D images into the display of the 3D reality mesh to recover lost context.

FIG. 4 is a high-level block diagram of an example architecture 400 for 3D reconstruction software and model visualization software that, respectively, produce a 3D reality mesh and integrate 2D images into the display of the 3D reality mesh to recover lost context. The 3D reality mesh may represent infrastructure. The 3D reconstruction software and the model visualization software may be separate software applications, or components (e.g., processes) of the same software application. In one embodiment the 3D reconstruction software is the ContextCapture™ application available from Bentley Systems, Inc. and the model visualization software is the ContextCapture™ Editor application or the Descartes™ 3D imagery processing application available from Bentley Systems, Inc.

The architecture 400 may be divided into local clients 410 of the 3D reconstruction software and/or model visualization software that execute on one or more computing devices local to an end-user (collectively "local devices") and cloud-based clients 420 of the 3D reconstruction software and/or model visualization software that execute on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information. The local clients 410 may provide a variety of user interface and non-processing intensive functions. For example, a local client of the model visualization software may provide a user interface for receiving user input and displaying views of a 3D reality mesh. The cloud-based clients 420 may provide a variety of background and processing intensive functions. For example, a cloud-based client of the 3D reconstruction software may generate a 3D reality mesh from a set of source 2D images (e.g., captured by a handheld camera or a camera of a UAV (not shown)), and in some cases supplemented with point cloud data (e.g., from a laser scanner or other device (not shown)). A services process 430 may coordinate operation of local clients 410 and cloud-based clients 420 of the 3D reconstruction software and/or the model visualization software.

Figure 5:
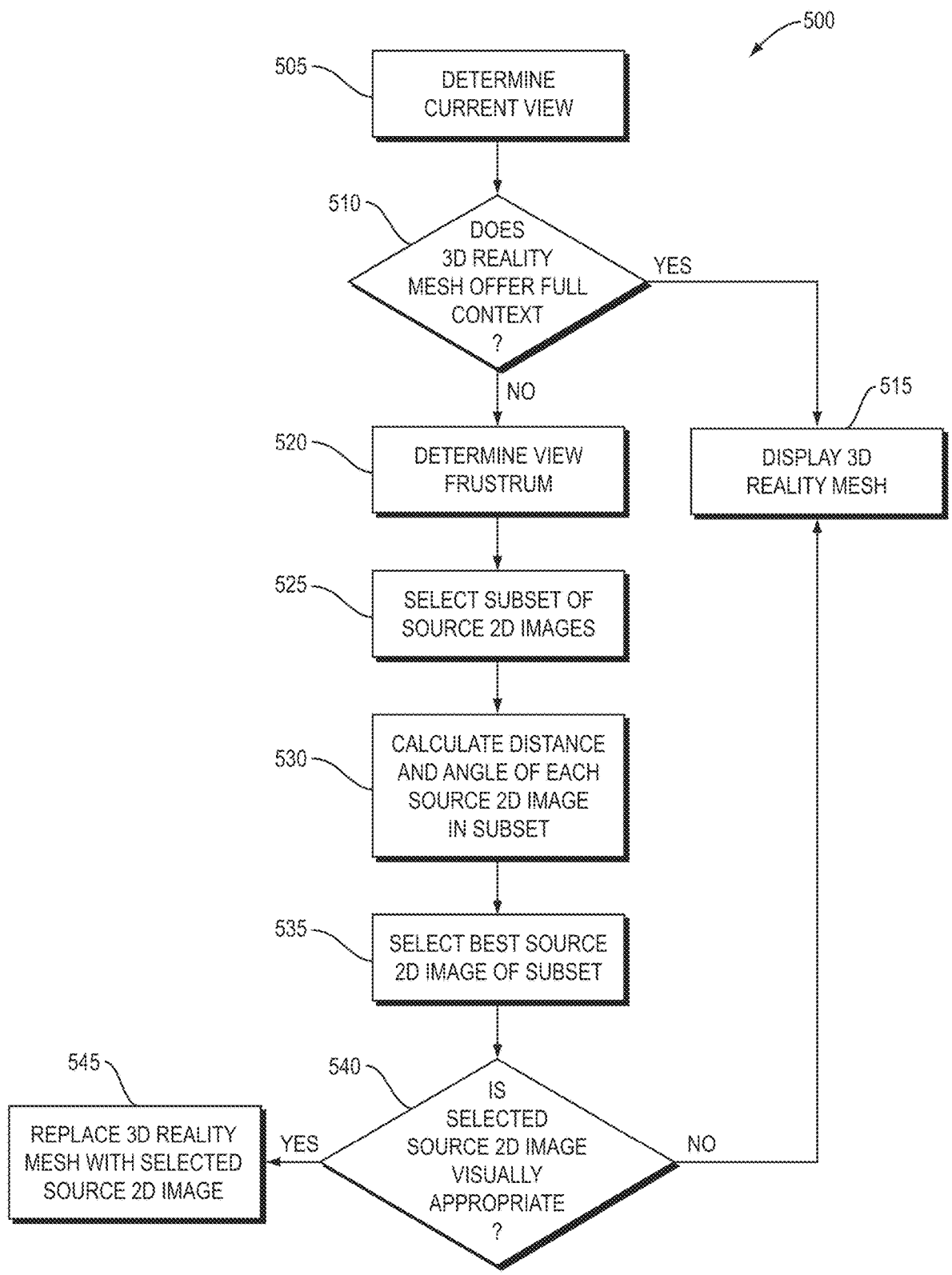
FIG. 5 is a flow diagram of an example sequence of steps for integrating 2D images into the display of a 3D reality mesh to recover lost context.

FIG. 5 is a flow diagram of an example sequence of steps 500 for integrating 2D images into the display of a 3D reality mesh to recover lost context. At step 505, the model visualization software determines a desired view of the 3D reality mesh to be shown in its user interface on a display screen, for example, in response to the user "zooming in" on a portion of the 3D reality mesh. The desired view may be defined by the position of a virtual camera in 3D space of the 3D reality mesh and a view direction vector of the virtual camera in 3D space of the 3D reality mesh.

At step 510, the model visualization software determines whether the 3D reality mesh includes a level of detail (LOD) that provides full context for the desired view. Full context is provided when shape and surface texture adequately reflect aspects of objects in the real-world. Lost context occurs when shape or surface texture does not adequately reflect aspects of objects in the real-world.

If the 3D reality mesh include a LOD that provides full context for the desired view, execution proceeds to step 515 where the model visualization software utilizes the LOD and displays the desired view of the 3D reality mesh in the user interface. If the 3D reality mesh lacks such a LOD, execution proceeds to step 520, where the model visualization software determines a view frustum for the desired view. Then, at step 525, the model visualization software selects a subset of source 2D images that intersect the view frustrum from the set of source 2D images used to reconstruct the 3D reality mesh, thereby filtering out source 2D images that do not contribute to the desired view.

At step 530, the model visualization software calculates a distance and angle for each source 2D image in the subset for the desired view, creating a distance-angle pair for each source 2D image. The distance is between a point associated with the source 2D image (e.g., representing a point in the plane of the 2D image when the 2D image is placed in the 3D space of the 3D reality mesh corresponding to where it was captured) and the position associated with the desired view (e.g., representing the center of a view near plane in the 3D space of the 3D reality mesh). The angle is between a vector associated with the source 2D image (e.g., a normal vector from a point in the plane of the source 2D image) and a view direction vector of the desired view (e.g., a vector extending from the center of the view far plane towards the center of the view near plane).

Figure 6:
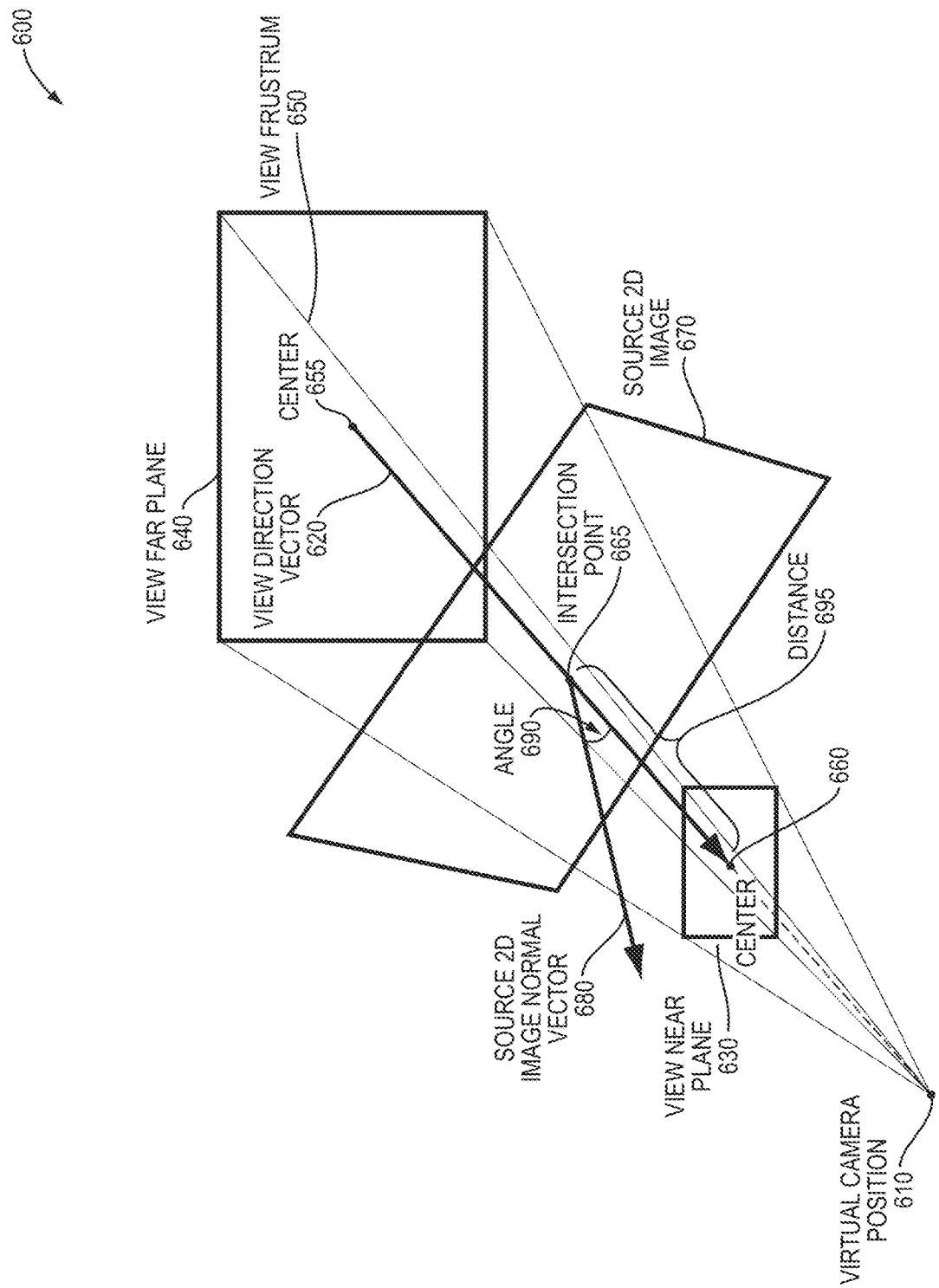
FIG. 6 is a diagram illustrating an example of calculating a distance and an angle for a source 2D image.

FIG. 6 is a diagram 600 illustrating an example of calculating a distance and an angle for a source 2D image. The desired view is determined by the position 610 and view direction vector 620 of a virtual camera, together with a view near plane 630 and a view far plane 640 in the 3D space of the 3D reality mesh. Objects between the view near plane 630 and the view far plane 640 that fall within a view frustrum 650 are displayed in the view. Objects that are nearer than the view near plane 630, or farther than the view far plane 640, are clipped out (i.e. not displayed). The view direction vector 620 extends down the center of the view frustum 650, from the center 655 of the view far plane 640 to the center 660 of the view near plane 630. A source 2D image 670 used to produce the 3D reality mesh is positioned in the 3D space. The view direction vector 620 extends through the source 2D image 670 at an intersection point 665. Typically, the intersection point 665 is not the center of the source 2D image 670 as it depends on the particular position of the source 2D image 670 in 3D space. The source 2D image 670 has a normal vector 680 extending back towards the view near plane 630. An angle 690 is calculated between the normal vector 680 and the view direction vector 620. Likewise, a distance 695 is calculated between the intersection point 665 of the view direction vector 620 and the source 2D image 670 and the center 660 of the view near plane 630 along the view direction vector 620.

At step 535, the model visualization software selects the source 2D image whose distance-angle pair indicates that it is closest to the position associated with the desired view and that it is nearest to perpendicular to the view direction vector of the desired view. This selection picks the source 2D image that will convey the most relevant information with the least distortive effect. A variety of different metrics may be used to evaluate distance and angle of the distance-angle pair. In one metric, model visualization software first sorts the source 2D images of the subset by distance to the position associated with the current view to pick closest 2D images, and then sorts the closest 2D images by nearness to perpendicular to the view direction vector of the current view, to produce a sorted list of source 2D images. A best source 2D images given the order of the sorted list is selected. It should be recalled that as the angle is measured from the normal vector, the source 2D image that it is nearest to perpendicular to the view direction vector will have an angle that is closest to 0 degrees.

At step 540, the model visualization software determines whether the selected source 2D image is visually appropriate for the desired view. The selected 2D image is considered to be visually appropriate when a distance from a point associated with the selected source 2D image (e.g., representing a point in the plane of the 2D image when the 2D image is placed in the 3D space of the 3D reality mesh corresponding to where it was captured) to a position of the desired view (e.g., representing the center of a view near plane) satisfies a distance threshold, and an angle is between a vector associated with the selected source 2D image (e.g., a normal vector from a point in the plane of the 2D image) and a view direction vector of the desired view (e.g., a vector extending from the center of the view far plane towards the center of the view near plane) satisfies an angle threshold. The distance threshold may be dynamically selected based on a scale of the desired view (e.g., the larger the area represented in the desired view the larger the distance threshold). In some implementations, the distance threshold may be on the order of a few meters. The angle threshold may be a preconfigured angle selected to ensure the source 2D image does not unduly distort the display, which may occur if the source 2D image diverges substantially from perpendicular to the view direction vector. Referring to FIG. 6. it should be recalled that the angle 690 is measured from the normal vector to the view direction vector. In some implementations, the angle threshold for angle 690 may less than 60 degrees to ensure that the source 2D image is not too far from perpendicular to the view direction vector 620.

At step 545, if the selected 2D image is determined to be visually appropriate, the model visualization software replaces the 3D reality mesh in the user interface with the selected source 2D image or a portion thereof. Otherwise, at step 515, the model visualization software displays the 3D reality mesh in the user interface.

Figure 1:
FIG. 1 is a view of an example 3D reality mesh that may be produced by 3D reconstruction software.
Figure 2:
FIG. 2 is a zoomed-in view of a first portion of the example 3D reality mesh of FIG. 1 depicting lost context for a sign.
Figure 7:
FIG. 7 is a zoomed-in view showing replacement of the example 3D reality mesh of FIG. 1 with a source 2D image to restore lost context of a sign.

FIG. 7 is a zoomed-in view 700 showing replacement of the example 3D reality mesh of FIG. 1 with a source 2D image to restore lost context of a sign. In contrast to FIG. 2 which shows the 3D reality mesh, the text "american grill" under "rbk" is readable.

Figure 3:
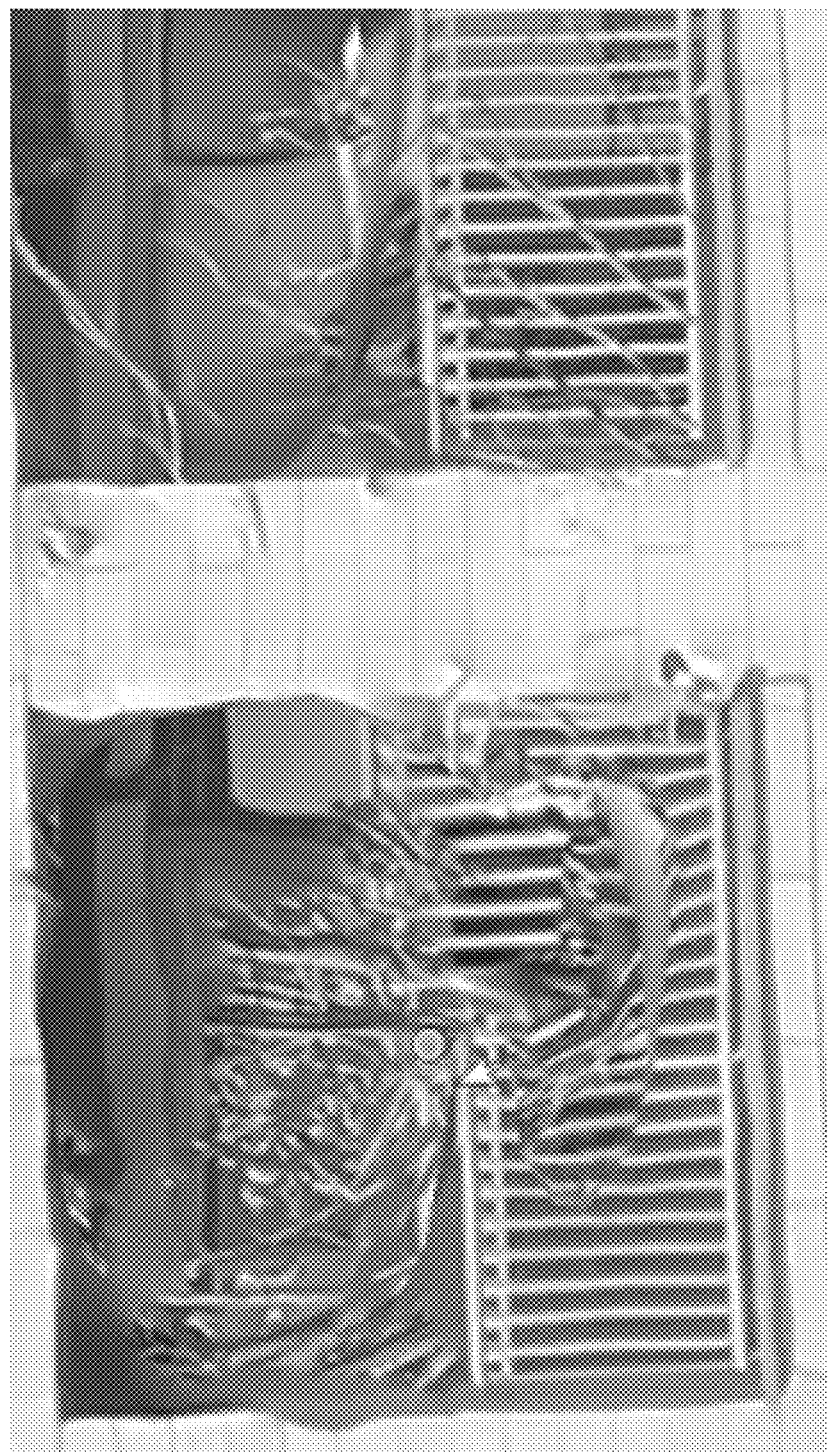
FIG. 3 is a zoomed-in view of a second portion of the example 3D reality mesh of FIG. 1 depicting lost context for a balcony of an apartment.
Figure 8:
FIG. 8 is a zoomed-in view showing replacement of the example 3D reality mesh of FIG. 1 with a source 2D image to restore lost context of a balcony of an apartment.

FIG. 8 is a zoomed-in view 800 showing replacement of the example 3D reality mesh of FIG. 1 with a source 2D image to restore lost context of a balcony of an apartment. In contrast to FIG. 3 which shows the 3D reality mesh, the railing of the balcony is distinct and clear.

It should be understood that various adaptations and modifications may be readily made to what is described above, to suit various implementations and environments. While it is discussed above that many aspects of the techniques may be implemented by specific software processes executing on specific hardware, it should be understood that some or all of the techniques may also be implemented by different software on different hardware. In addition to general-purpose computing devices/electronic devices, the hardware may include specially configured logic circuits and/or other types of hardware components. Above all, it should be understood that the above descriptions are meant to be taken only by way of example.

What is claimed is:

1. A method for displaying a three-dimensional (3D) reality mesh, comprising:
   determining, by model visualization software executing on one or more computing devices, a desired view of the 3D reality mesh to be shown in a user interface of the model visualization software;
   selecting a source two-dimensional (2D) image from a set of source 2D images used to reconstruct the 3D reality mesh;
   determining, by the model visualization software, whether the selected source 2D image is visually appropriate for the desired view, wherein the selected source 2D image is considered to be visually appropriate when a distance from a point associated with the selected source 2D image to a position associated with the desired view satisfies a distance threshold and an angle from a normal vector of the selected source 2D image to a view direction vector of the desired view satisfies an angle threshold; and
   when the selected 2D image is determined to be visually appropriate, replacing, by the model visualization software, the 3D reality mesh in the user interface with the selected source 2D image or a portion thereof.

2. The method of claim 1, further comprising:
   when the selected 2D image is determined to be visually inappropriate, showing, by the model visualization software, the 3D reality mesh in the user interface.

3. The method of claim 1, further comprising:
   determining whether there is a level of detail (LOD) in the 3D reality mesh for the desired view,
   wherein selecting the source 2D image and determining whether the selected source 2D image is visually appropriate are performed in response to determining there is no LOD in the 3D reality mesh for the desired view.

4. The method of claim 1, wherein selecting the source 2D image further comprises:
   determining a view frustrum for the desired view; and
   selecting two or more source 2D images that intersect the view frustrum from the set of source 2D images used to reconstruct the 3D reality mesh to form a subset of the set of source 2D images,
   wherein the selected source 2D image is chosen from the subset.

5. The method of claim 4, wherein selecting the source 2D image further comprises:
   calculating a respective distance and a respective angle for each source 2D image in the subset of the set of source 2D images for the desired view, wherein the respective distance for each source 2D image in the subset is between a respective point associated with that respective source 2D image and the position associated with the desired view, and the respective angle for each respective source 2D image in the subset is between a respective normal vector of that respective source 2D image and the view direction vector of the desired view,
   wherein the selected source 2D image is chosen from the subset based on the respective distance and the respective angle for each source 2D image in the subset.

6. The method of claim 5, wherein selecting the source 2D image further comprises:
   choosing the selected source 2D image based on, for each source 2D image in the subset of the set of source 2D images, closeness of the respective point associated with that respective source 2D image to the position associated with the desired view and nearness of each respective source image to perpendicular to the view direction vector of the desired view.

7. The method of claim 6, wherein choosing uses a metric that first sorts each source 2D image of the subset of the set of source 2D images by the respective distance for each source 2D image, and then sorts each source 2D image of the subset by the nearness of each respective source image to perpendicular to the view direction vector of the desired view, to produce a sorted list of the subset of the set of source 2D images, wherein the selected source 2D image is chosen based on an order of the sorted list.

8. The method of claim 1, wherein the distance threshold used to determine the selected source 2D image is visually appropriate for the desired view is dynamically selected based on a scale of the desired view.

9. The method of claim 1, wherein the angle threshold used to determine the selected source 2D image is visually appropriate for the desired view is a preconfigured angle.

10. The method of claim 1, wherein the set of source 2D images are 2D photographs captured by a handheld camera or a camera of an unmanned aerial vehicle (UAV), and the 3D reality mesh is a textured polygon mesh model of infrastructure.

11. A computing device configured to display a three-dimensional (3D) reality mesh comprising:

a display screen;
a processor; and
a memory coupled to the processor and configured to store software that, when executed by the processor, cause the processor to:
  determine a view frustrum based on a desired view of the 3D reality mesh to be shown in a user interface on the display screen,
  select source two-dimensional (2D) images that intersect the view frustrum from a set of source 2D images used to reconstruct the 3D reality mesh to form a subset of the set of source 2D images,
  select a source 2D image from the subset that is visually appropriate for the desired view, wherein the selected source 2D image is considered to be visually appropriate when a distance from a point associated with the selected source 2D image to a position associated with the desired view satisfies a distance threshold and an angle from a normal vector of the selected source 2D image to a view direction vector of the desired view satisfies an angle threshold, and
  replace the 3D reality mesh in the user interface with the selected source 2D image or a portion thereof.

12. The computing device of claim 11, wherein selection of the source 2D image is based on a metric that first sorts each source 2D image of the subset of the set of source 2D images by a respective distance for each source 2D image between a respective point associated with that respective source 2D image and the position associated with the desired view, and then sorts each source 2D image of the subset by nearness of each respective source image to perpendicular to the view direction vector of the desired view, to produce a sorted list of the subset of the set of source 2D images, and the selected source 2D image is chosen based on order of the sorted list.

13. The computing device of claim 11, wherein the set of source 2D images are 2D photographs captured by a handheld camera or a camera of an unmanned aerial vehicle (UAV), and the 3D reality mesh is a textured polygon mesh model of infrastructure.

14. A non-transitory electronic-device readable medium having instructions stored thereon, wherein the instructions, when executed by one or more electronic devices, cause the one or more electronic devices to:
  determine a desired view of a three-dimensional (3D) reality mesh to be shown in a user interface;
  for each of a set of source two-dimensional (2D) images used to reconstruct the 3D reality mesh for the desired view, calculate a respective distance and a respective angle of each source 2D image, wherein the respective distance is between a respective point associated with that respective source 2D image and a position associated with the desired view, and the respective angle is between a respective normal vector of that respective source 2D image and a view direction vector of the desired view;
  select a source 2D image from the set of source 2D images based on the respective distance and the respective angle for each source 2D image in the set of source 2D images;
  determine whether the selected source 2D image is visually appropriate for the desired view, wherein the selected source 2D image is considered to be visually appropriate when calculated distance of the selected source 2D image satisfies a distance threshold and calculated angle of the selected source 2D image satisfies an angle threshold;
  when the selected source 2D image is determined to be visually appropriate, replace the 3D reality mesh in the user interface with the selected source 2D image or a portion thereof; and
  when the selected source 2D image is determined to be visually inappropriate, show the 3D reality mesh in the user interface.

15. The non-transitory electronic-device readable medium of claim 14, wherein the instructions, when executed by the one or more electronic devices, further cause the one or more electronic devices to:
  determine whether there is a level of detail (LOD) in the 3D reality mesh for the desired view,
  wherein the selection of the source 2D image and determination of whether the source 2D image is visually appropriate for the desired view are performed in response to determining there is no LOD in the 3D reality mesh for the desired view.

16. The non-transitory electronic-device readable medium of claim 14, wherein the instructions, when executed by the one or more electronic devices, further cause the one or more electronic devices to:
  determine a view frustrum for the desired view; and
  select two or more source 2D images that intersect the view frustrum from the set of source 2D images used to reconstruct the 3D reality mesh to form a subset of the set of source 2D images,
  wherein selection of the selected source 2D images is from the subset.

17. The non-transitory electronic-device readable medium of claim 16, wherein the instructions, when executed by the one or more electronic devices, further cause the one or more electronic devices to:
  select the source 2D image based on, for each source 2D image in the subset of the set of source 2D images, closeness of the respective point associated with that respective source 2D image to the position associated with the desired view, and nearness of each respective source 2D image to perpendicular to the view direction vector of the desired view.

18. The transitory electronic-device readable medium of claim 14, wherein the set of source 2D images are 2D photographs captured by a handheld camera or a camera of an unmanned aerial vehicle (UAV) and the 3D reality mesh is a textured polygon mesh model of infrastructure.

* * * * *